US007205537B2

(12) United States Patent
Nikolaev

(10) Patent No.: US 7,205,537 B2
(45) Date of Patent: Apr. 17, 2007

(54) ION GUIDES WITH MOVABLE RF MULTIPLE SEGMENTS

(75) Inventor: Evgenij Nikolaev, Moscow (RU)

(73) Assignee: Bruker Daltonic GmbH, Bremen (DE)

( * ) Notice: Subject to any disclaimer, the term of this patent is extended or adjusted under 35 U.S.C. 154(b) by 0 days.

(21) Appl. No.: 11/147,154

(22) Filed: Jun. 7, 2005

(65) Prior Publication Data

US 2005/0279930 A1 Dec. 22, 2005

(30) Foreign Application Priority Data

Jun. 11, 2004 (DE) ...................... 10 2004 028 418

(51) Int. Cl.
*B01D 59/44* (2006.01)

(52) U.S. Cl. ...................... 250/292; 250/290; 250/288; 250/287; 250/281; 250/497.1; 250/498.1; 250/507.1

(58) Field of Classification Search ..................... None
See application file for complete search history.

(56) References Cited

U.S. PATENT DOCUMENTS 4,700,069 A 10/1987 Ino et al.
5,384,461 A 1/1995 Jullien et al.
5,525,084 A 6/1996 Broadbent et al.
5,825,026 A * 10/1998 Baykut ....................... 250/288
6,515,279 B1 * 2/2003 Baykut ....................... 250/285
6,593,570 B2 * 7/2003 Li et al. ..................... 250/290

FOREIGN PATENT DOCUMENTS

DE 19523859 A1 6/1995
DE 19629134 C1 7/1996
DE 19937439 C1 8/1999

* cited by examiner

*Primary Examiner*—Jack Berman
*Assistant Examiner*—Zia R. Hashmi
(74) *Attorney, Agent, or Firm*—The Law Offices of Paul E. Kudirka

(57) ABSTRACT

The invention relates to an ion guide consisting of RF multipole segments to transfer ions from an ion source into a mass analyzer. The invention consists in having movable RF multipole segments in the ion guide which extend or electrically connect other RF multipole segments along the axis of the ion guide, in which spaces have arisen as a result of a change in configuration of the mass spectrometer, comprising ion source, ion guide and mass analyzer. The moved RF multipole segments bridge the spaces which have arisen between the components of the mass spectrometer and facilitate the transfer of the ions from the ion source to the mass analyzer.

4 Claims, 6 Drawing Sheets

ION GUIDES WITH MOVABLE RF MULTIPLE SEGMENTS

FIELD OF THE INVENTION

The invention relates to an ion guide consisting of RF multipole segments to transfer ions from an ion source into a mass analyzer.

BACKGROUND OF THE INVENTION

Electric RF multipole fields have long been used to guide ions in ion guides without the use of magnetic fields. These RF multipole fields can easily be generated with at least two pairs of long, thin, parallel rods or tubes distributed uniformly on a surface of a cylinder. Neighboring rod-shaped or tubular electrodes are supplied with the two phases of an RF voltage. This creates a pseudopotential between the rod-shaped or tubular electrodes, which keeps the ions in the interior of the cylinder. With two pairs of rod-shaped or tubular electrodes, a quadrupole field is created between the electrodes; with more than two pairs of rods, hexapole, octopole, decapole fields, etc. are created. The rod-shaped or tubular electrodes used to guide ions have a diameter of less than one millimeter and are typically 10 to 50 centimeters long. The interior formed by the electrodes is very narrow and has a diameter of only 2 to 4 millimeters, by means of which sufficiently strong multipole fields can be generated with low RF voltages.

Apart from these rod-shaped or tubular electrodes, other shapes of electrodes are described in DE 195 23 895 A1 and U.S. Pat. No. 5,572,035A with which an ion-guiding pseudopotential can be generated.

Nowadays, ion guides are used in almost all mass spectrometers in which the ions are generated outside the vacuum (out-of-vacuum ion sources), for example by ESI (electrospray ionization) or APCI (atmospheric pressure chemical ionization). The ion guides here often comprise several electrically isolated RF multipole segments of these rod-shaped or tubular electrodes, which can differ with respect to the number and arrangement of the electrodes, and the frequency and amplitude of the RF voltage, for example.

Some of the mass analyzers can only be operated under ultra-high vacuum conditions ($p<10^{-6}$ Pa). In contrast, the out-of-vacuum ion sources are operated at up to atmospheric pressure. If generated out-of-vacuum, the ions are first transferred from the region of the ion source through an opening or capillary into the vacuum system and conveyed on to the mass analyzer. The residual gas originating from the ion source is evacuated in several differential pump stages until the operating pressure of the mass analyzer is reached. The chambers of adjacent differential pump stages are interconnected only via small openings. The rod-shaped or tubular electrodes are often limited to the chamber; the ion guide then consists of several RF multipole segments separated from each other.

For some types of mass analyzer, particularly for ion cyclotron resonance spectrometers (ICR MS), the ultra-high vacuum region can be separated from the ion source by means of a valve. Sliding valves, which have thicknesses of around 30 millimeters in the direction of the axis of the ion guide, are the preferred option here because they are small. Separation by means of a valve is necessary in order to protect the ultra-high vacuum in the mass analyzer from contamination when the ion source and adjacent regions of the ion guide are cleaned or serviced. The availability of the mass spectrometer is increased because the sensitive ultra-high vacuum of the mass analyzer is maintained during cleaning or servicing and does not have to be produced again in a protracted process. The insertion of a valve means that the two adjacent RF multipole segments of the ion guide have a separation which, when the valve is open, the ions can bridge only with a lens system, given the current prior art.

The method of operation of the ICR MS means that a strong magnetic field is required in the mass analyzer. The transfer of the ions from the region where there is no magnetic field into the strong magnetic field of the mass analyzer is demanding because the ions are reflected, as if in a magnetic bottle, at the magnetic field of the mass analyzer if they do not move close to the axis and parallel to the lines of the magnetic field. Outside the mass analyzer there is a magnetic stray field which can neither be completely avoided nor shielded sufficiently. The separating valve can modify the magnetic stray field in such a way that the valve has to be taken into consideration in the design of the lens system.

Ion guides are also used for types of ionization in which the ions are generated within the vacuum (in-vacuum ion source), such as matrix-assisted laser desorption and ionization MALDI. The ion sources which operate on the MALDI principle are used in ion trap mass spectrometers (IT MS), ion cyclotron resonance spectrometers (ICR MS) and time-of-flight mass spectrometers (TOF MS).

When using in-vacuum ion sources, the ion guides are used mainly in cases where the ions are not only guided but the ion guide also fulfils further objectives during the conditioning of the ions. These objectives consist in cooling the ions in a damping gas, in the dissociation of the ions by molecular collisions (CID=collision induced dissociation) or by electron capture (ECD=electron capture dissociation), in the intermediate storage of the ions, or in the selection in mass filters, for example. The differences in the objectives also result in the ion guide being subdivided into RF multipole segments because the individual RF multipole segments have different operating parameters. The most important operating parameters here are the number and arrangement of the electrodes, the frequency and the voltage amplitude of the RF voltage, additional DC voltage between and along the rod-shaped electrodes, and the pressure conditions in the interior between the electrodes. The operating parameters of an individual RF multipole segment are adapted to suit its specific objective, but are also determined by the mass spectrometer, comprising ion source, ion guide and mass analyzer.

The ions collide with the neutral molecules of a collision gas in a fragmentation cell and dissociate (CID). If the ions have low kinetic energy, the collisions in the gas do not lead to a fragmentation but only to a damping of the ion motion and cooling of the ions. The fragmentation or damping cells are often separated from the neighboring RF multipole segments in order to maintain the required vacuum conditions in the other RF multipole segments and in the mass analyzer. As is the case with the differential pump stages of an out-of-vacuum ion source, these gas-filled cells are only connected to the neighboring chambers via small openings and separate the RF multipole segments of the ion guide.

At the transition between the RF multipole segments of the ion guide, the fringing fields cause the ions at the ends of the RF multipole segments to be partially reflected, resulting in loss of transmission. These transmission losses during the passage between the RF multipole segments can be minimized by interposing diaphragms and lenses. An ion guide comprising a single RF multipole segment has lower losses and increases the sensitivity of the mass spectrometer.

If the diaphragms or lenses are put at a repelling DC potential for a certain period, then the pseudopotential of the RF multipole field and the DC potential of the diaphragms or lenses temporarily store the ions in the interior, which is defined by the rod-shaped or tubular electrodes and the diaphragms or lenses.

Mass spectrometers have been described in DE 196 29 134 C1 and DE 199 37 439 C1 which make it possible to choose between more than one ion source by sliding or turning movable RF multipole segments of the ion guide. It is therefore possible to change the configuration of the mass spectrometer without having to ventilate it. In both publications, an individual movable RF multipole segment has no electrical contact to other RF multipole segments of the ion guide. In order to avoid losses as the ions pass between the RF multipole segments of the ion guide, the distance between adjacent RF multipole segments must be as small as possible without causing electrical flashovers or crosstalk. Nevertheless, there are losses at the electric fringing fields between the RF multipole segments. In addition, each movable RF multipole segment of the ion guide must be individually connected to an RF voltage.

SUMMARY OF THE INVENTION

The invention provides an ion guide made of RF multipole segments with which ions in a mass spectrometer can be guided from the ion source to the mass analyzer after a change in the configuration has created spaces between the segments of the ion guide. There are movable RF multipole segments in the ion guide which extend or electrically interconnect other RF multipole segments, between which spaces (gaps) have arisen as a result of a change in configuration of the mass spectrometer. The moved RF multipole segments fill the gaps created in the ion guide and thus form variable "ion bridges". This requires that the electrodes of the movable RF multipole segments are congruent with the electrodes of the RF multipole segments that are being extended or bridged. After extension or connection, a moved RF multipole segment is in electrical contact with at least one other RF multipole segment. This electrical contact supplies the moved RF multipole segment with an RF voltage and generates an RF multipole field which guides the ions in the interior of the moved RF multipole segment with low losses. According to the invention, the movable RF multipole segments do not each require their own voltage supply, which reduces cost. If two stationary RF multipole segments are electrically connected by a movable RF multipole segment, then only one of the stationary RF multipole segments requires a power supply in order to generate an ion-guiding RF multipole field in the interior of the three RF multipole segments. This means that an additional power supply for a stationary RF multipole segment is not required, and that the respective electrodes of the three RF multipole segments are exactly in phase with each other.

BRIEF DESCRIPTION OF THE DRAWINGS

The above and further advantages of the invention may be better understood by referring to the following description in conjunction with the accompanying drawings in which.

DETAILED DESCRIPTION

Figure 1:
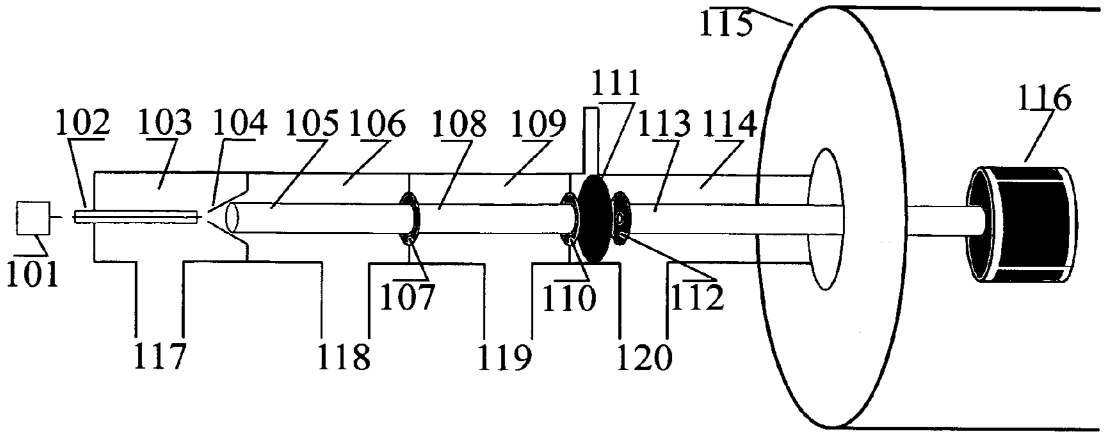
FIG. 1 shows a schematic representation of a mass spectrometer comprising an ion source, an ion guide with a separating valve and an ICR mass analyzer.

FIG. 1 shows a mass spectrometer comprising an ion source, an ion guide and an ICR mass analyzer. The ions are generated in the out-of-vacuum electrospray ion source 101. The RF multipole segments 105, 108 and 113 of the ion guide are located in the vacuum chambers 106, 109 and 114. The mass spectrometric measurement is carried out in the ICR measuring cell 116. The strong magnetic field required for the measurement in the ICR mass analyzer is generated in a magnet 115. Outside the magnet 115 there is a magnetic stray field. The ion guide allows transfer of the ions generated in the out-of-vacuum ion source 101 into the ICR measuring cell 116 with low losses.

The ions are generated in the out-of-vacuum ion source 101 by electrospray ionization (ESI) and introduced through an inlet capillary 102 with a diameter of approx. 0.5 millimeters and a length of 160 millimeters into the first chamber 103 of the vacuum system. An electric field draws the ions to the tapered skimmer 104, and they enter the vacuum chamber 106 through a central opening. The gas from the out-of-vacuum ion source 101, which also flows in through the inlet capillary 102, is deflected outwards by the tapered gas skimmer 104 and evacuated through the vacuum connection 117 down to a residual pressure of around 100 Pa. The chambers 106, 109 and 114 are separated by the diaphragms 107 and 110 and connected to a pump system via the vacuum connections 118, 119 and 120 respectively. The small aperture diameters of the diaphragms mean that the chambers 106,109 and 114 form a differential pump section with typical pressures of $10^{-1}$ Pa, $10^{-5}$ Pa or $10^{-8}$ Pa. The first RF multipole segment 105 of the ion guide begins directly behind the opening in the skimmer 104. This segment consists of rod-shaped or tubular electrodes arranged in a hexapole or octopole, as are the RF multipole segments 108 and 113. The RF multipole segments 105 and 108 convey the ions to the aperture 110.

In FIG. 1, the separating valve 111 is closed and completely separates the chambers 109 and 114 from each other. The mounting dimensions of the separating valve mean that the RF multipole segments 108 and 113 are separated by a distance of some 30 millimeters when the separating valve is open. Without the lens systems 110 and 112, the ions cannot pass through this space when the separating valve is open without incurring extremely large losses. The separating valve protects the ultra-high vacuum in the ICR measuring cell 116 ($p<10^{-7}$ Pa) from contamination when the upstream parts of the ion guide are cleaned or serviced. The availability of the mass spectrometer is increased by the separation of the vacuum system because the sensitive ultra-high vacuum of the ICR mass analyzer is maintained during cleaning or servicing and does not have to be produced again in a protracted process. After the lens system 112, the ions are conveyed through the RF multipole segment 113 to the ICR measuring cell 116.

The specialist is aware that RF multipole segments can carry out other functions apart from ion transport, for example ion storage, selection according to ion mass, cooling or fragmentation of ions, if the corresponding operating parameters for the RF multipole segments are selected. The number of such RF multipole segments in a mass spectrometer is obviously not limited to the three segments 105, 108 and 113 in FIG. 1.

Figure 2A:
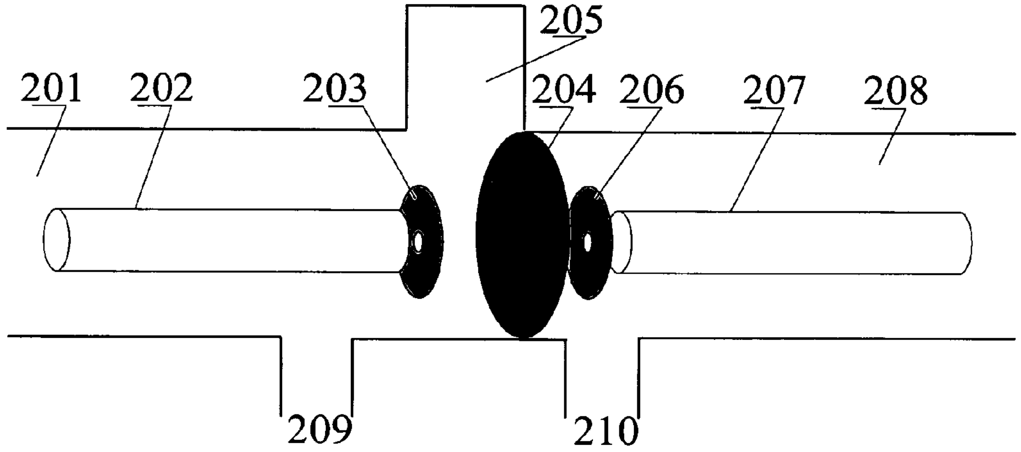
FIG. 2 shows a schematic representation of a separating valve with a lens system.
Figure 2B:
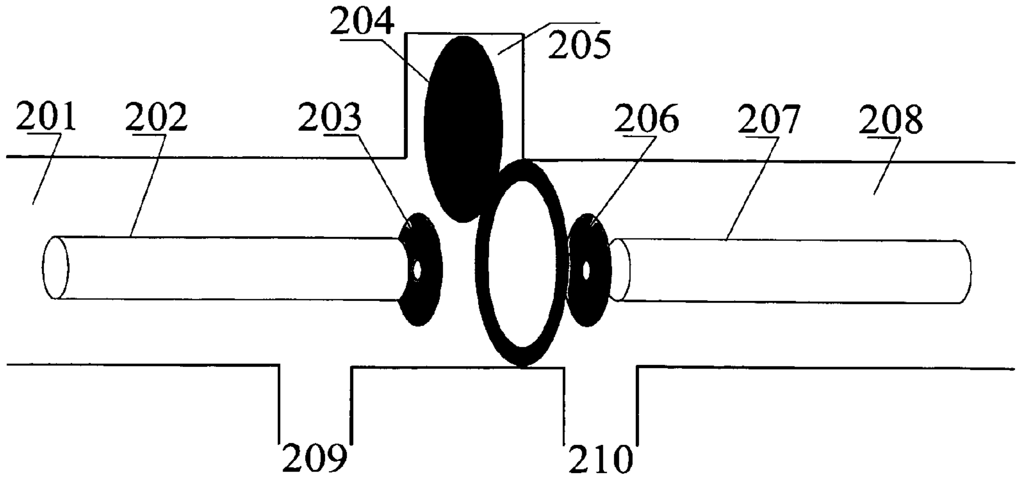

FIG. 2*a* shows a section from an ion guide in which the vacuum chambers 201 and 208 are separated by a valve. In FIG. 2*b*, the cap 204 of the valve has been moved into the secondary chamber 205 and the valve is open. The chamber 201 and the chamber 208 are evacuated through the vacuum connections 209 and 210 respectively and can be ventilated independently of each other when the valve is closed. The RF multipole segments 202 and 207 consist of rod-shaped or tubular electrodes arranged on a surface. Neighboring electrodes are each supplied with an antiphase RF voltage. FIGS. 2*a* and 2*b* show only the surfaces in whose interior the ions are guided by the RF multipole fields. The RF multipole segments 202 and 207 are roughly 30 to 50 millimeters apart. When the valve is open, the ions coming from the RF multipole segment 202 move in the field of the lens systems 203 and 206 to the RF multipole segment 207. Without the field of the lens systems 203 and 206 only a very small fraction of the ions would overcome the space between the RF multipole segments 202 and 207.

Figure 3A:
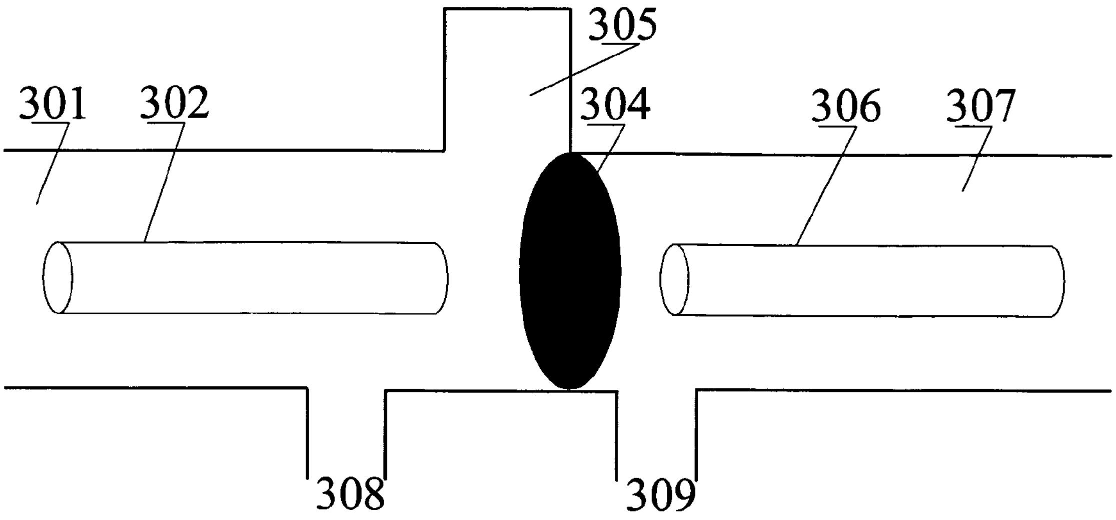
FIG. 3 shows a schematic representation of a separating valve with a movable RF multipole segment.
Figure 3B:
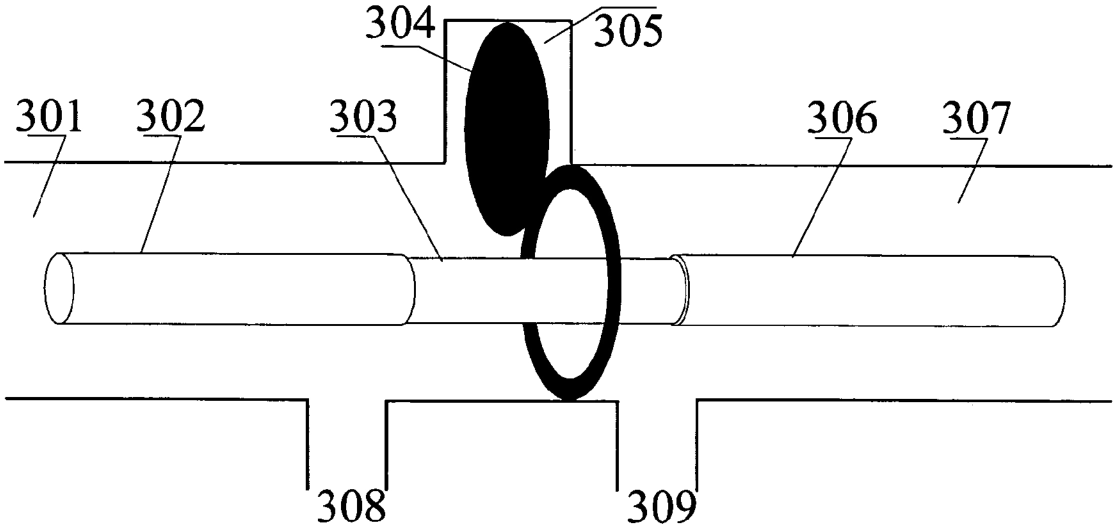

FIGS. 3*a* and 3*b* show a schematic representation of an embodiment according to the invention. As is the case with FIGS. 2*a* and 2*b*, these illustrations also depict a section from an ion guide in which there is a valve between the vacuum chambers 301 and 307. The two chambers can be evacuated and ventilated separately via the vacuum connections 308 and 309. The RF multipole segments 302 and 306 consist of rod-shaped or tubular electrodes arranged on a surface which is shown here. Neighboring electrodes are each supplied with an antiphase RF voltage. In contrast to FIGS. 2*a* and 2*b* there are no lens systems. When the valve is closed, the electrodes of the movable RF multipole segment 303 are situated near the stationary RF multipole segment 302. The two preferred embodiments in FIGS. 4 and 5 illustrate how the rod-shaped or tubular electrodes of movable RF multipole segments are inserted into other RF multipole segments. In FIG. 3*b*, the movable RF multipole segment 303 has been moved out of the segment 302 in the direction of the segment 306 when the valve is open. The three RF multipole segments 302, 303 and 306 are electrically interconnected, producing a multipole field in the interior of the movable RF multipole segment 303, in which the ions move from segment 302 to segment 306. When used as a variable "ion bridge" the movable RF multipole segment has advantages over the lens system in FIGS. 2*a* and 2*b*. The ion losses and the susceptibility to external influences, such as the magnetic field of an ICR measuring cell, are lower, and the acceptance of the ions with respect to the spatial and velocity distribution is better.

Figure 4A:
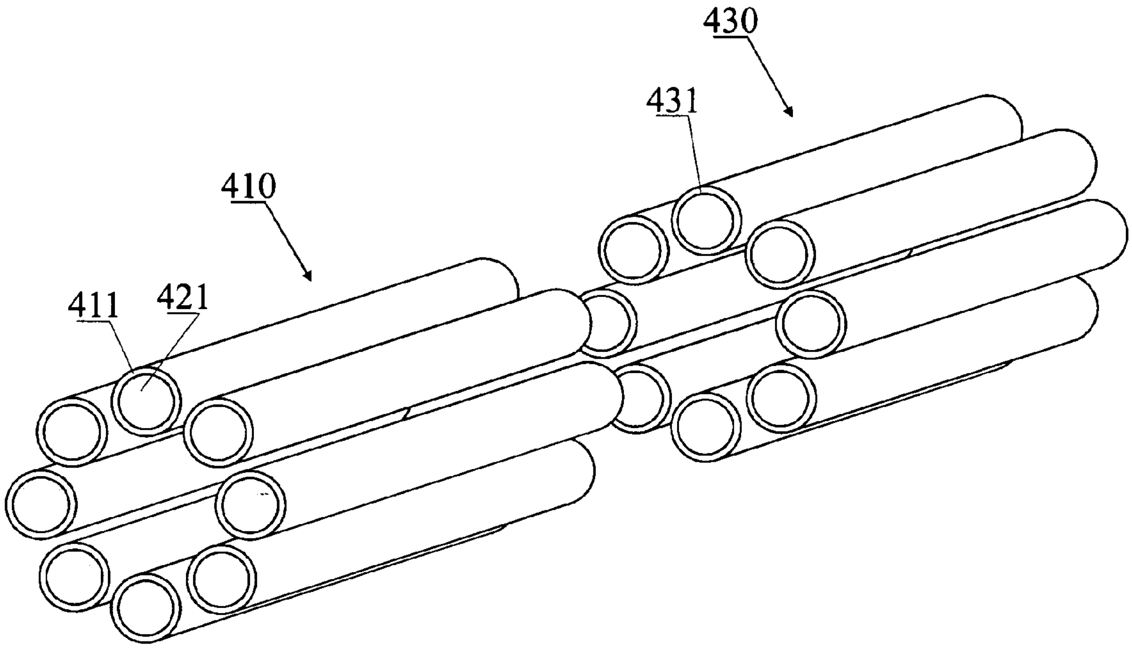
FIG. 4 shows preferred embodiments of movable RF multipole segments with rod-shaped and tubular electrodes.
Figure 4B:
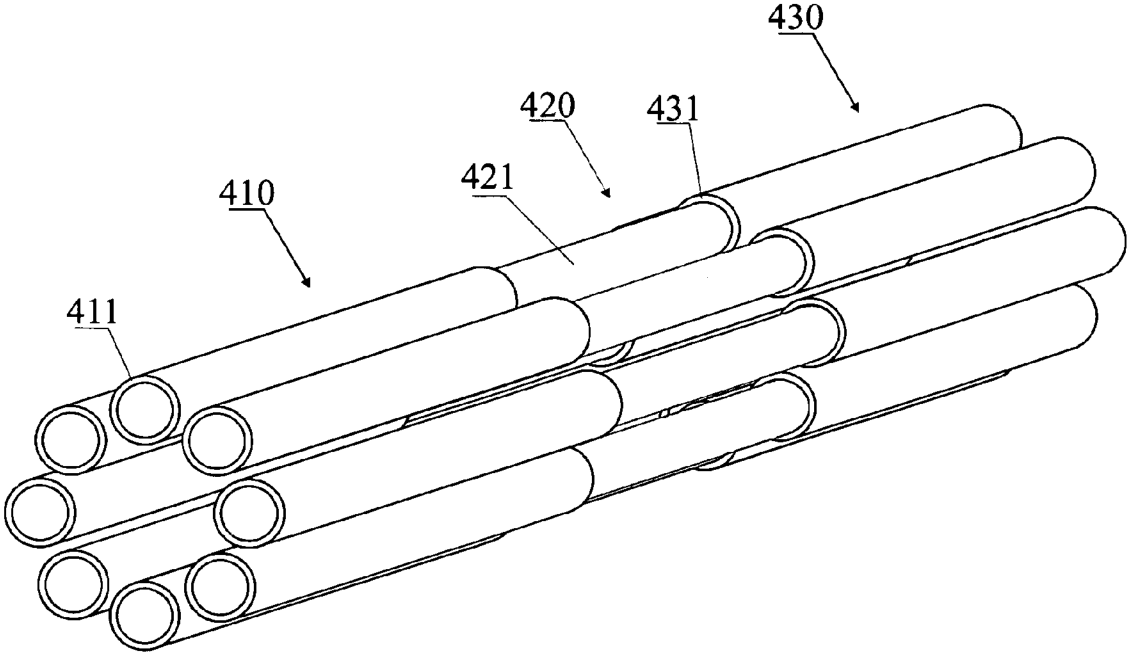

FIGS. 4*a* to 4*d* illustrate a preferred embodiment for a movable RF multipole segment. FIG. 4*b* shows two stationary RF octopole segments 410 and 430 as well as a movable RF octopole segment 420. The stationary segments 410 and 430 consist of eight tubular electrodes. The movable RF octopole segment 420 is constructed from eight rod-shaped electrodes, whose diameters correspond to the inside diameter of the tubular electrodes of the segments 410 and 430, and which can be slid along the axis of the electrodes. The electrodes of the RF octopole segments 410, 420 and 430 are all made of conductive material. In FIG. 4*a*, the rod-shaped electrodes of the segment 420 are pushed into the tubular electrodes of the segment 410, and in FIG. 4*b*, they are pushed out. There is an antiphase RF voltage across the neighboring tubular electrodes of a stationary segment (410 or 430). In FIG. 4*b*, the movable electrode 421 electrically connects the two electrodes 411 and 431. The same applies to the corresponding electrodes of the three RF octopole segments 410, 420 and 430. An octopole field is generated in the interior of all three RF octopole segments 410, 420 and 430, and this field guides the ions along the whole length of the electrically connected RF octopole segments 410, 420 and 430.

Figure 4C:
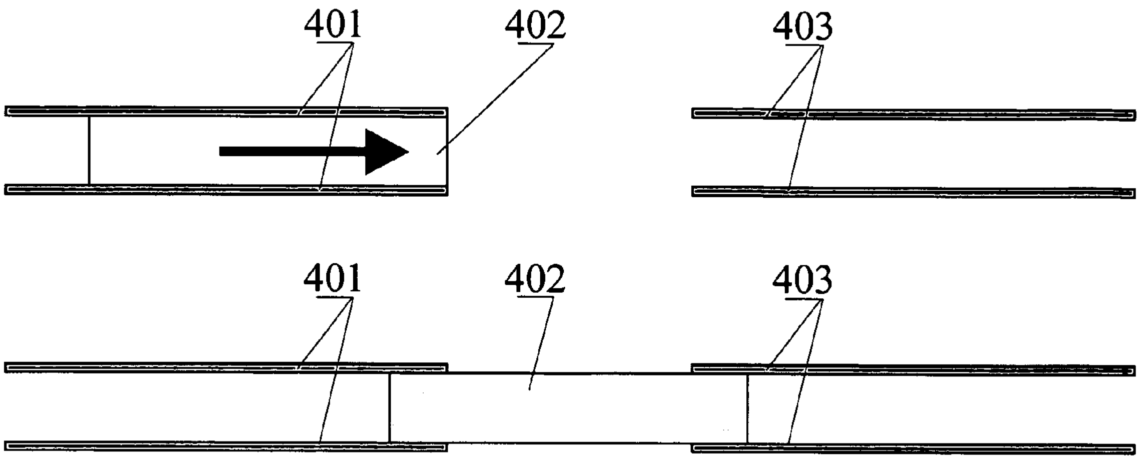
Figure 4D:
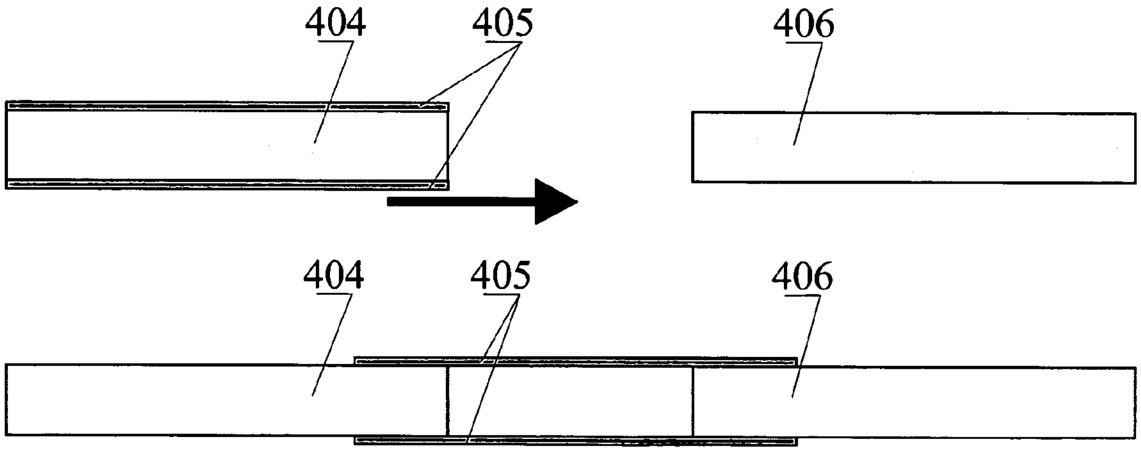

FIG. 4*c* illustrates the cross-section of the electrodes 411, 421 and 431. In this case, electrodes 401 and 411, 402 and 421, and 403 and 431 correspond. The arrow indicates that the rod-shaped electrode 402 is movable with respect to the stationary tubular electrodes 401 and 403 and electrically connects the two stationary tubular electrodes 401 and 403 after a translation movement. The wall thickness of the tubular electrodes 401 and 403 must be kept as small as possible, as otherwise the discontinuities at the transition between the electrodes 401 and 402 or 402 and 403 cause fringing fields with axial field components at which the ions are partially reflected. FIG. 4*d* shows the cross-section of electrodes of another preferred embodiment of a movable RF octopole segment. Unlike FIG. 4*c*, the rod-shaped electrodes 404 and 406 here are stationary, and the movable electrode 405 is tubular in shape. After a translation movement of the electrode 405, the three electrodes 404, 405 and 406 are electrically interconnected. In both embodiments, the movable RF octopole segment can be accommodated near a stationary RF octopole segment, providing a great space-saving advantage, and only one single translation movement of the RF octopole segment 420 ("sliding multipole") is required to bridge the two stationary RF octopole segments.

Figure 5A:
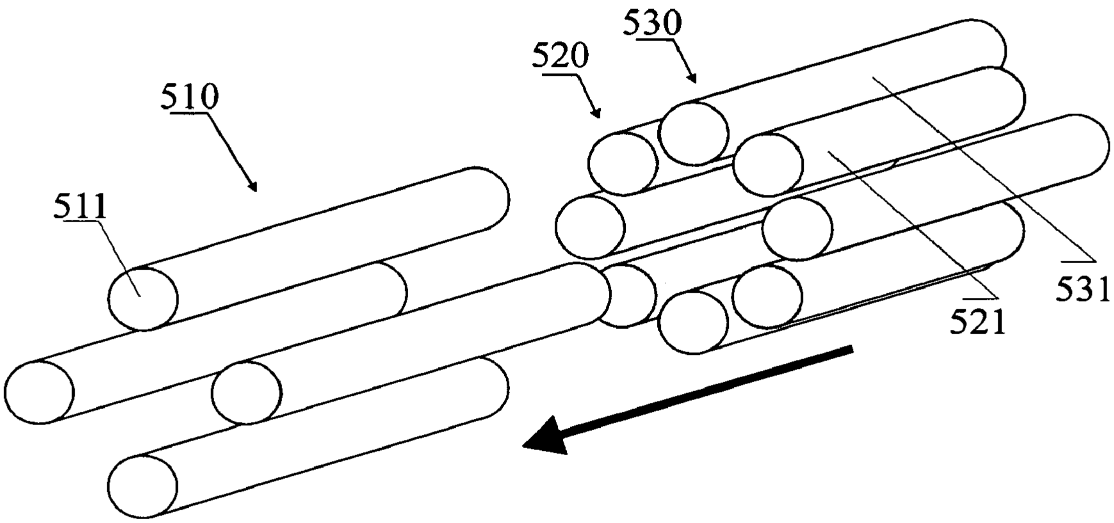
FIG. 5 shows a further preferred embodiment of a movable RF multipole segment with rod-shaped electrodes.
Figure 5B:
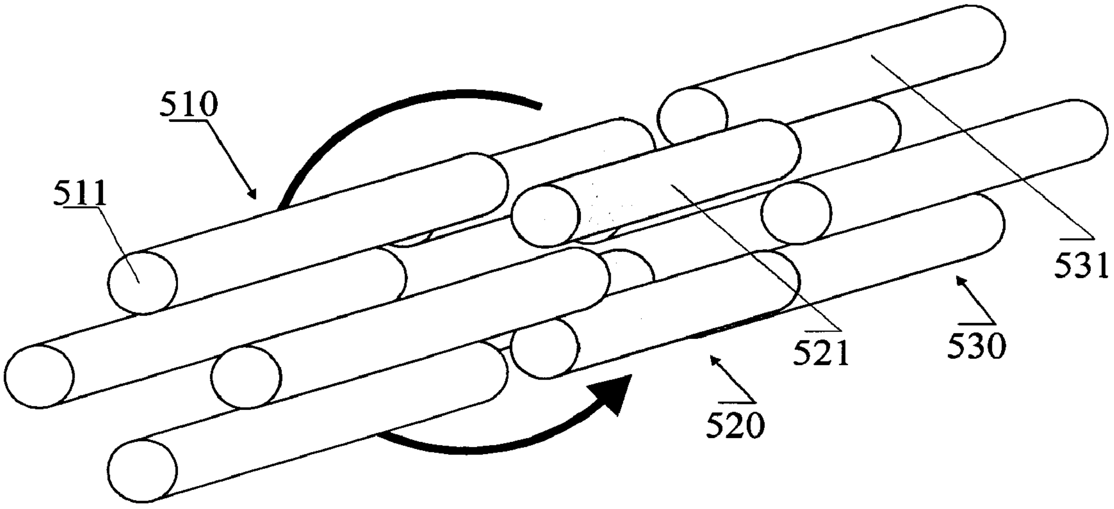
Figure 5C:
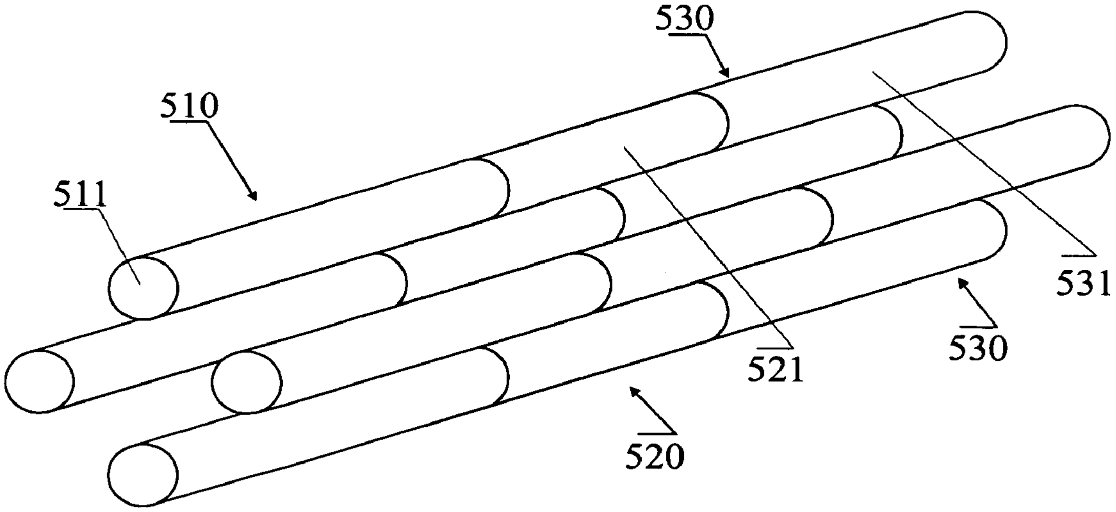

FIGS. 5*a* to 5*c* illustrate a further preferred embodiment for a movable RF multipole segment. FIGS. 5*a* to 5*c* show two stationary RF quadrupole segments 510 and 530 as well as a movable RF quadrupole segment 520. In FIG. 5*a*, the rod-shaped electrodes of the movable segment 520 are situated between the rod-shaped electrodes of the stationary segment 530. The electrodes of the RF quadrupole segments 510, 520 and 530 are all made of conductive material. From FIG. 5*a* to 5*b* the movable segment 520 is slid by means of a translation movement into the space between the two stationary segments 510 and 530. After a rotational movement, the movable electrode 521 electrically connects the two rod-shaped electrodes 511 and 531 with each other (see FIG. 5*c*). The same applies for the other corresponding electrodes of the RF quadrupole segments 510, 520 and 530. Applying an antiphase RF voltage to a stationary segment (510 or 530) generates a quadrupole field in the interior of the three electrically connected segments 510, 520 and 530, in which the ions are guided from segment 510 to segment 530.

Figure 5D:
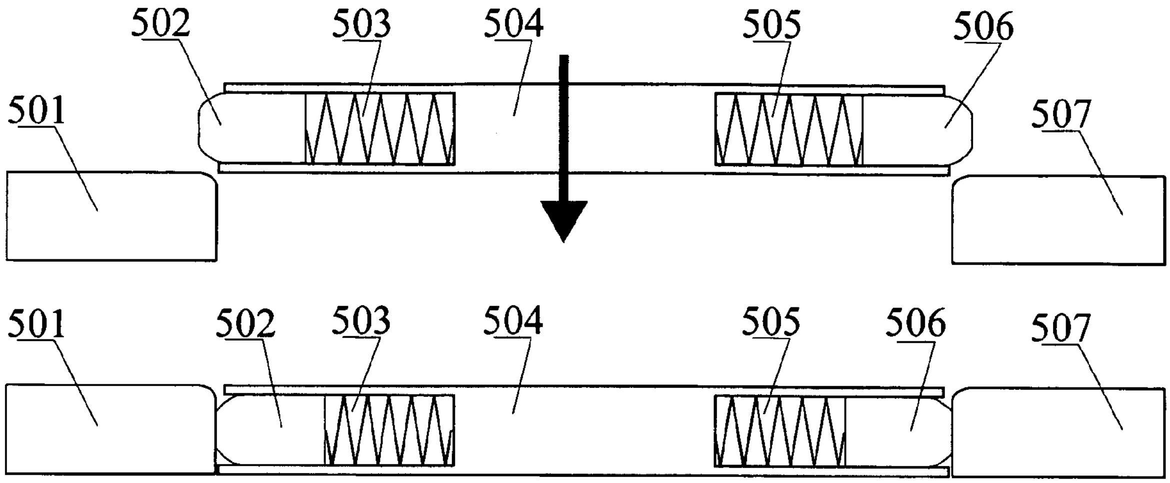

FIG. 5*d* illustrates an embodiment of the movable electrode 521 of the RF quadrupole segment 520 in cross-section. The stationary electrodes 501 and 507 correspond to the stationary electrodes 511 and 531 in FIG. 5*c*. The movable electrode 521 has a rod-shaped main body 504 with end bores into which contact bodies 502 and 506 are introduced. The contact bodies 502 and 506 are connected to the main body 504 by means of the springs 503 and 505 respectively, and are pressed into the bores of the main body 504 by the movement shown in FIG. 5*d*. The contact bodies 502 and 506 are electrically connected to the main body 504. If the movable electrode 521 is slid between the stationary electrodes 511 and 531, then the two stationary electrodes 511 and 531 are electrically connected via the end surface of the contact bodies 502 and 506 and the main body 504. A recess on the end of the electrodes 501 and 507 provides a connection between the electrodes 501, 504 and 507.

The RF quadrupole segment 520 ("revolver multipole") forms a variable "ion bridge" between stationary RF multipole segments, as does the RF octopole segment 420 ("sliding multipole") in FIG. 4. Compared to a lens system, the revolver multipole offers the same advantages as a "sliding multipole". Comparing the "revolver multipole" to the "sliding multipole" shows that with the "revolver multipole", two movements are necessary in order to make the connection between the stationary RF multipole segments, and that the space between the stationary electrodes limits the number of movable electrodes. However, the transitions between the RF multipole segments in the case of the "revolver multipole" are more favorable with respect to the homogeneity of the multipole field generated.

The embodiments in FIGS. 4 and 5 illustrate rod-shaped or tubular electrodes in quadrupole and octopole arrangements. It is apparent to the specialist that other RF multipole electrodes can also be used. Furthermore, in the embodiments shown in FIGS. 1 to 3, only the separation between two RF multipole segments is bridged, this separation being caused by a separating valve. Without limiting the generality, the movable RF multipole segments according to the invention are capable of bridging any space in an ion guide which arises from a change in configuration.

The automatic connection of the RF multipole segments by the bridging RF multipole segment has the further advantage that no vacuum feedthroughs for the RF voltage are needed for the connected RF multipole segment. It may however be necessary to switch the RF generator to a state better adapted to the now higher capacitive load.

What is claimed is:

1. Ion guide for transferring ions, comprising RF multipole segments, wherein a) at least one RF multipole segment is movable with respect to other RF multipole segments of the ion guide, and b) the movable RF multipole segments can be spatially moved so as to have electrical contact with other RF multipole segments and either extend these other RF multipole segments or electrically interconnect these other RF multipole segments.

2. Ion guide according to claim 1, wherein the RF multipole segments of the ion guide consist of rod-shaped or tubular electrodes, and neighboring rod-shaped or tubular electrodes are supplied with an antiphase RF voltage.

3. Ion guide according to claim 2, wherein the rod-shaped or tubular electrodes of the movable RF multipole segments can be slid into or over the rod-shaped or tubular electrodes of other RF multipole segments.

4. Ion guide according to claim 2, wherein the rod-shaped or tubular electrodes of the movable RF multipole segments can be moved between the rod-shaped or tubular electrodes of other RF multipole segments.

* * * * *